United States Patent
Skworcow et al.

(10) Patent No.: US 7,301,061 B2
(45) Date of Patent: Nov. 27, 2007

(54) METHOD OF PROCESSING INDUSTRIAL AND MUNICIPAL, ORGANIC, RUBBER-CONTAINING WASTES

(76) Inventors: Igor Skworcow, ul. Mszczonowska 62A, Nadarzyn (PL) 05-830; Alexei Matveev, ul. Smolnaja 39 m. 36, Moscow (RU)

( * ) Notice: Subject to any disclaimer, the term of this patent is extended or adjusted under 35 U.S.C. 154(b) by 620 days.

(21) Appl. No.: 10/392,018

(22) Filed: Mar. 19, 2003

(65) Prior Publication Data
US 2004/0077908 A1 Apr. 22, 2004

(30) Foreign Application Priority Data
Oct. 18, 2002 (PL) .................................. 356730

(51) Int. Cl.
*C10G 1/10* (2006.01)
(52) U.S. Cl. .................. 585/241; 208/67; 423/449.2; 521/41
(58) Field of Classification Search .............. 585/241, 585/240; 201/2.5, 25, 215
See application file for complete search history.

(56) References Cited

U.S. PATENT DOCUMENTS 4,077,847 A * 3/1978 Choi et al. ................ 201/21
5,917,102 A * 6/1999 Holighaus et al. .......... 585/241
6,184,427 B1 * 2/2001 Klepfer et al. .............. 585/241
6,525,105 B1 * 2/2003 Udagawa et al. ............. 521/41
6,683,227 B2 * 1/2004 Platz et al. .................. 585/241

FOREIGN PATENT DOCUMENTS

GB 2113693 * 8/1983
RU 2250239 * 4/2005

* cited by examiner

*Primary Examiner*—Tam M. Nguyen
(74) *Attorney, Agent, or Firm*—McKee, Voorhees & Sease, P.L.C.

(57) ABSTRACT

The present invention is a utilization method for rubber-containing, organic industrial and municipal wastes which may be applied in the fields of petrochemical and chemical industry. Raw material is liquefied at 60-310° C. under 0.1-0.2 MPa pressure in aprotic hydrocarbon solvent in any neutral gas or $CO_2$ atmosphere with simultaneous collection from reactor of liquid hydrocarbon fractions with the boiling temperatures reaching 200° C. and above and further rectification of fractions up to 200° C. and then drying solid residues at temperatures 270-310° C. Application of solvents and gases makes this process to be ecologically clean. The present invention makes possible a solution of the ecological problem of utilization of rubber-containing and other wastes.

7 Claims, 1 Drawing Sheet

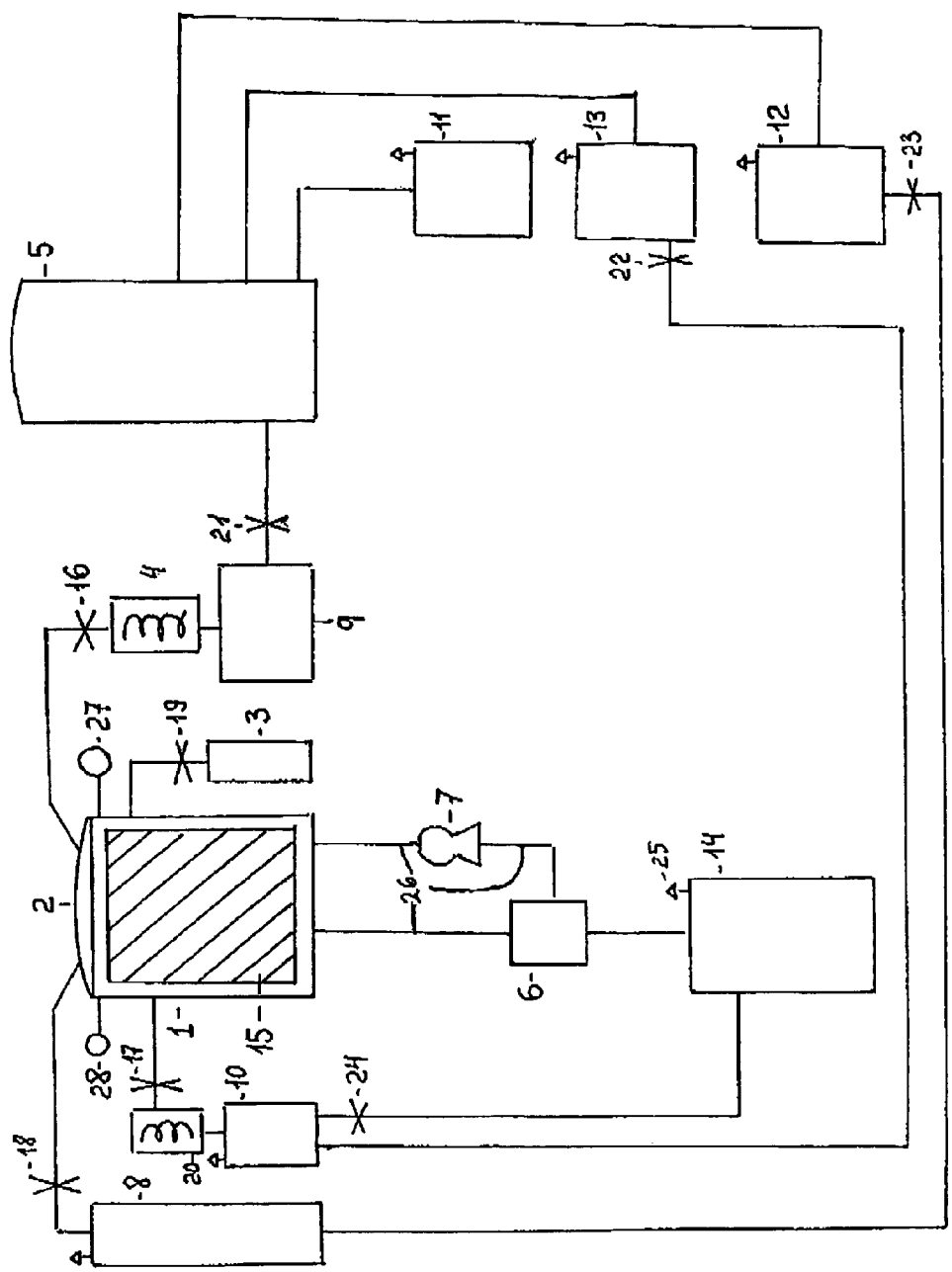

METHOD OF PROCESSING INDUSTRIAL AND MUNICIPAL, ORGANIC, RUBBER-CONTAINING WASTES

BRIEF SUMMARY OF THE INVENTION

This invention describes utilization method for industrial and municipal organic wastes. In particular invention relates to processing of wastes containing rubber, polyethylene, lawsan, polystyrol, polypropylene, caprone and so on for chemical substrate and engine fuel.

BRIEF DESCRIPTION OF THE DRAWINGS

The drawing is a schematic of the system for processing of wastes for chemical substrate and engine fuel.

DETAILED DESCRIPTION OF THE PREFERRED EMBODIMENT

There is well known processing method of wastes containing rubber based on their liquefaction in temperature range 270-420° C. under pressure of 1-6 MPa in the environment of hydrocarbon solvent, which is obtained as a side-product in synthetic rubber and in the presence of lanthanide (rare soils element) or in the presence of intermetallic compounds based on rare soils elements or in the presence of titanium hydride, added in amount of 0.5-10% of total reaction mass. This method provides thermal liquefaction at the hydrocarbon solvent and wastes weight ratio of 2:1-4:1. This method is characterized by a low conversion factor of hydro-donating potential of the solvent components what requires repeated use of the same in the process, permanent isolation from liquid products of starting substrate thermal liquefaction and raised pressure keeping in reaction vessel (RU N2109770, 1998).

A substantial drawback of this method is application also as hydrocarbon solvent synthetic rubber production wastes, which are not always available in sufficient amounts. Additionally, there are also required rather deficit elements of rare soils, their intermetallic compounds, potassium, titanium hydrides.

There is also well known method of conversion of organic rubber-containing industrial and municipal wastes into a chemical substrate and engine fuel components similar to the one described above, in which as hydrogen-donating hydrocarbon solvents are used single alkylbenzene or mixture of alkylobenzenes (toluene, xylenes, ethylbenzenes, diethyl-, trimethyl- and tetramethylbenzenes) which are base components of raw benzol—product of hard coal carbonization process. Listed above hydrocarbons are effective hydrogen donors, they are present at large amounts, their application in this technology enable solving both technological, ecological as well as economic problem (RU N 2110535, 1998).

A substantial drawback of this method is application of rare soil elements, intermetallic compounds based on neodymium, lanthanium, cerium, aluminum and titanium and potassium hydrides, which are rather deficit reagents, difficulties related with their further extraction from the mass of technical hydrocarbons and heavy hydrocarbon residues with high resin level, high pressure in the reaction vessel due to a low hydrogen conversion from gas phase originating from thermal decomposition of organic products.

There is also known process for processing of rubber containing wastes and organic industrial, municipal wastes, according to which wastes are subjected to thermo-catalytic liquefaction in temperature 220-360° C., under pressure of 1-3 MPa in a hydrocarbon solvent in the presence of initiating agent-free iodine and/or compounds containing iodine, added in the amount of 0.01-0.50% w/w of solvent, next with isolation of liquid products and their rectification in the purpose to receive final products. According to this method there are used organic and non-organic iodine-containing compounds as iodides of potassium, titanium, cobalt, nickel, ethyl iodide and others or mixture of thereof. As solvents there are used alkylbenzenes, mixtures of alkylbenzenes and hydrocarbon mixtures containing benzene.

A substantial drawback of this method is running the process in closed environment, without liquid fractions collection and high energy consumption for following fractionation of total reaction mixture, also because of the presence of fine-dispersed 0.05÷0.5 μm hydrocarbon (smoke-black) and used overpressure.

Application for the described above process iodine and /or iodine-containing compounds, both organic and metal salts or their mixture prevents from reaching high process efficiency. As metals there are suggested Ti, Co, Ni, what causes process to be more expensive and makes it also to be ecologically harmful.

The idea of this invention is to develop a method which allows elimination of the rare soil elements, intermetallic compounds based on them, Ti, Co, Ni, increased pressures and will simplify technology, increase efficiency, minimalise explosion or fire hazard, increase process ecological purity, increase number of fractions with the boiling temperature up to 200° C., in reality without presence of sulfur and sulfur compounds.

This goal is reached in method for processing of wastes containing rubber for engine fuel based on their liquefaction at conditions of raised temperatures and increased pressure in the presence of hydrocarbon solvent and in the presence of inert gas or in mixture of inert gases with simultaneous collection of liquid products and their rectification. Method according to this invention is characterized that process is realized at temperatures range 60-310° C. and under pressure 0.1-0.2 MPa, with simultaneous constant collection of liquid fractions directly from the reactor. In the first stage of process there is collected fraction with boiling temperatures below 200° C., in the second stage fraction with boiling temperature exceeding 200° C. and the residue is dried at temperature 270-310° C.

As listed above inert gas it is recommended to use argon, carbon dioxide or mixture of these two gases.

As a solvent it is recommended to use toluene or raw benzol keeping ratio of substrate to solvent as 1:2.

Another recommended form of running process is to perform it under pressure of 0.8 MPa.

Process according to the present invention is described on the basis of presented schematic figure. Reactor (1) with capacity up to 10,000 liters is loaded with a cage (15) containing starting raw material. The reactor cover (2) is closed, next valves (19, 16 and 17) are opened and reactor is filled with selected gas. The valve (19) is closed, and next after valve (18) is opened reactor is filled in with selected solvent until it covers starting raw material. Weight ratio of starting raw material to solvent is kept equal to 1:1; 1:2 or 1:3. Next the valve (16 or 17) is closed and heat fluid heating oven (6) is turned on. Heating medium flow through pipes (26) is forced by pump (7). As a heating fuel (15) is used fraction with boiling temperature exceeding 200° C. The temperature in reactor raises up (28). After reaching 60° C. is reached pressure begins to increase (pressure meter 27). With the help of throttle valve (16) a selected, 0.1-0.2 MPa pressure value is set up. Gas products going through the condenser (4) are distilled and collected in the container (9). After the temperature of 200° C. is reached, the valve (16) is closed and the valve (17) is opened so the selected pressure value is kept. Gases passing through the condenser (20) are distilled and collected in the container (10). After reaching the temperature 270° C., the heating fluid oven (6) is turned off. The temperature automatically increases to 300-310° C. and starts process of the solid residues drying up. After the temperature in the reactor (1) drops to 60° C., the cover (2) is opened and the cage (15) is discharged from the reactor. The process is completed.

In reactor (1) fraction with boiling temperature up to 200° C. is with the help of valve (21) transferred to rectifying column (5), where three following fractions are obtained: fraction with boiling temperature 62-112° C., container (11); fraction with boiling temperature 112-200° C., container (12); fraction with boiling temperature exceeding 200° C., container (13). The fraction 112-200° C. from container (12) through the valve (23) is transferred to the container (8) and is used as a solvent. The fraction with boiling temperature exceeding 200° C., container (13) through the valve (22) is transferred to the container (10), and next through the valve (24) is transferred to container (14)—fuel tank and is used as a boiler fuel in the heating oven (6) for heating fluid. The fraction with boiling temperature of 62-112° C. makes a petrol fraction.

This invention is illustrated in presented below examples, which are not limiting scope of this invention.

EXAMPLE 1

Reactor chamber volume 11 is filled with 320-340 g of wastes containing rubber and 640-680 g of toluene-hydrocarbon solvent. Chamber with opened vents is purged with argon. During collection of fraction with boiling temperatures exceeding 200° C. vents are closed. Next reactor is heated up to 300° C. While temperature exceeds 60° C. in reactor chamber overpressure is kept on the level no exceeding 0.2 MPa and constantly is performed collection of fraction through condenser, with boiling temperatures up to 200° C. After reaching temperature of 200° C. vent for collection of fractions up to 200° C. is closed and is opened vent for collection of fraction with boiling temperatures exceeding 200° C. while there is still continued collection of liquid products through condenser. After reaching temperature of 300° C. heating is stopped.

Total percent mass of fractions with boiling temperatures up to 200° C. in relation to all collected liquid products is 86%. Collected fractions with boiling temperatures up to 108° C. and 108-112° C. in mass percent in relation to total mass of rectified fractions up to 200° C., collected from reactor, is equal respectively to 6.2% and 88.1%. Total time of process is equal to 90 minutes. Ratio of raw substrate to solvent is equal to 1:2. After cooling till temperature of 60-80° C. is reached, reactor chamber is cleaned from the solid residues with opened vents.

EXAMPLE 2

All procedure is like in Example 1 except reactor chamber being purged with carbon dioxide. Total percent mass of fractions with boiling temperatures up to 200° C. in relation to all collected liquid products is 88%. Collected fractions with boiling temperatures up to 108° C. and 108-112° C. in mass percent in relation to total mass of rectified fractions up to 200° C., collected from reactor, is equal respectively to 5.6% and 74.6%. Total time of process is equal to 75 minutes. After cooling till temperature of 60-80° C. is reached, reactor chamber is cleaned from the solid residues.

EXAMPLE 3

All procedure is like in Example 1 and 2 except reactor chamber being purged with carbon dioxide, raw benzol is used as hydrocarbon solvent. Total percent mass of fractions with boiling temperatures up to 200° C. from reactor in relation to all collected liquid products is 88%. Collected fractions with boiling temperatures up to 108° C. and 108-112° C. in mass percent in relation to total mass of rectified fractions up to 200° C., collected from reactor, is equal respectively to 75% and 8%. Total time of process is equal to 75 minutes. After cooling till temperature of 60-80° C. is reached, reactor chamber is cleaned from the solid residues.

All data from Examples 1,2,3 are collected in the following table:

| Ordeal No | P Mpa | GAS | Time of processing in minutes | Effluent of fraction boiling T up to 200° C. (out of the reactor) in mas. % liquid products | Effluent of fraction boiling 112° C. in mas. % % liquid retification of fraction up reactor Up to 108° C. |
|---|---|---|---|---|---|
| 1. | 1.1-0.2 | argon | 90 | 86 | 6.2 |
| 2. | 1.1-0.2 | $CO_2$ | 75 | 88 | 5.6 |
| 3. | 0.8 | $CO_2$ | 75 | 88 | 75 |

This table was performed according to the data on utilization of worn out car tires.

Final products, received according to the procedures described in Examples 1,2,3 can be used in the following manner:

- fractions up to 108 and 108-112° C.—as engine fuel, as additive increasing fuel octane number, in chemical industry—as substrate for synthesis of sterols and other chemical compounds
- fractions 112-120° C. and exceeding 200° C.—as fuel in power stations, ship engines, as substrate in chemical industry
- dry residues—as substrate for production of isolating materials, asphalt, in electromechanical industry.

The components of the system for processing industrial and municipal organic rubber containing wastes are identified by reference numerals as follows:

| | |
|---|---|
| 1. 1. | Reactor |
| 2. 2. | Cover |
| 3. 3. | Gas station |
| 4 and 20. | Condensers |
| 5. 5. | Rectifying column |
| 6. 6. | Heating fluid oven. |
| 7. 7. | Pump |
| 8. 8. | Solvent container |
| 9. 9. | Fraction with boiling temperature below 200° C. container |
| 10. 10. | Fraction with boiling temperature above 200° C. container |
| 11. 11. | Fraction with boiling temperature 62-112° C. container |
| 12. 12. | Fraction with boiling temperature 112-200° C. container |

| | -continued |
|---|---|
| 13. 13. | Fraction with boiling temperature above 200° C. container |
| 14. 14. | Fuel container |
| 15. 15. | Raw material cage |
| 16-19, 21-24. | Valves |
| 25. | Gas separators |
| 26. | Pipe line |
| 27. | Manometer |
| 28. | Thermometer |

What is claimed is:

1. A method for processing wastes containing rubber into useable substances comprising:
   a. heating the wastes in the presence of a hydrocarbon solvent and an inert gas to a temperature of approximately 100° C. under a pressure of approximately 0.1 to 0.2 MPa while simultaneously collecting a liquid fraction comprising engine-grade fuel;
   b. thereafter heating the wastes in the presence of the hydrocarbon solvent and the inert gas to an approximate temperature of 200° C. under an approximate pressure of 0.1 to 0.2 MPa while simultaneously collecting a liquid fraction comprising a hydrocarbon based solvent; and
   c. thereafter heating the wastes in the presence of the hydrocarbon solvent and the inert gas to temperatures above 200° C. at approximately 0.1 to 0.2 MPa while simultaneously collecting a liquid fraction comprising boiler-grade fuel.

2. The method according to claim 1, wherein the inert gas comprises argon.

3. The method according to claim 1, wherein the inert gas comprises CO2.

4. The method according to claim 1, wherein the solvent comprises toluene or raw benzol.

5. The method according to claim 1 further comprising drying a residue from the wastes.

6. The method according to claim 1 further comprising mixing a second inert gas with the inert gas.

7. The method according to claim 1, wherein the temperature range for collecting liquid fractions is approximately 60° C. to 310° C.

* * * * *